United States Patent [19]
Zhu

[11] Patent Number: 5,423,009
[45] Date of Patent: Jun. 6, 1995

[54] DYNAMIC SIZING BUS CONTROLLER THAT ALLOWS UNRESTRICTED BYTE ENABLE PATTERNS

[75] Inventor: Michael H. Zhu, San Jose, Calif.

[73] Assignee: Sierra Semiconductor Corporation, San Jose, Calif.

[21] Appl. No.: 296,603

[22] Filed: Aug. 29, 1994

Related U.S. Application Data

[63] Continuation of Ser. No. 19,429, Feb. 18, 1993, abandoned.

[51] Int. Cl.⁶ .................. G06F 13/40; G06F 13/42
[52] U.S. Cl. .................. 395/325; 364/DIG. 1; 364/DIG. 2; 364/240; 364/240.3; 364/935; 364/935.2; 364/935.4; 364/935.45; 364/935.47
[58] Field of Search ............ 364/DIG. 1, DIG. 2; 395/209, 275, 250, 325, 500, 800

[56] References Cited

U.S. PATENT DOCUMENTS

4,633,437 12/1986 Mothersole et al. ................ 395/250

*Primary Examiner*—Robert B. Harrell
*Attorney, Agent, or Firm*—Burns, Doane, Swecker & Mathis

[57] ABSTRACT

A data transfer mechanism is provided between a host device and a slave device in which the slave bus width is automatically configured according to mode information, and the exact number of slave cycles required are generated according to the host request. In particular, a bus interface controller interfaces a host device having a host bus of a predetermined physical bus width to a slave device having a slave bus of a variable one of multiple possible logical bus widths, where the host device physical bus width in bits is an integer multiple of the slave device logical bus width in bits. First circuitry is responsive to a request from the host device for exchanging handshaking signals with the slave device to execute a number of slave bus transfer cycles until a last cycle signal has been received, and for returning a completion signal to the host device. Second circuitry is responsive to mode-related signals and byte enable signals from the host device for generating the last cycle signal for the first circuitry. Together, the first circuitry and the second circuitry therefore implement what may be termed a "checking-and-moving" scheme. That is, the first circuitry continues to interact with the slave device to execute data transfer cycles until the first circuitry receives a last cycle signal from the second circuitry, which continually checks to see if the present cycle is the last cycle. The resulting data transfer mechanism is conceptually simple, scalable, and easy to implement.

3 Claims, 11 Drawing Sheets

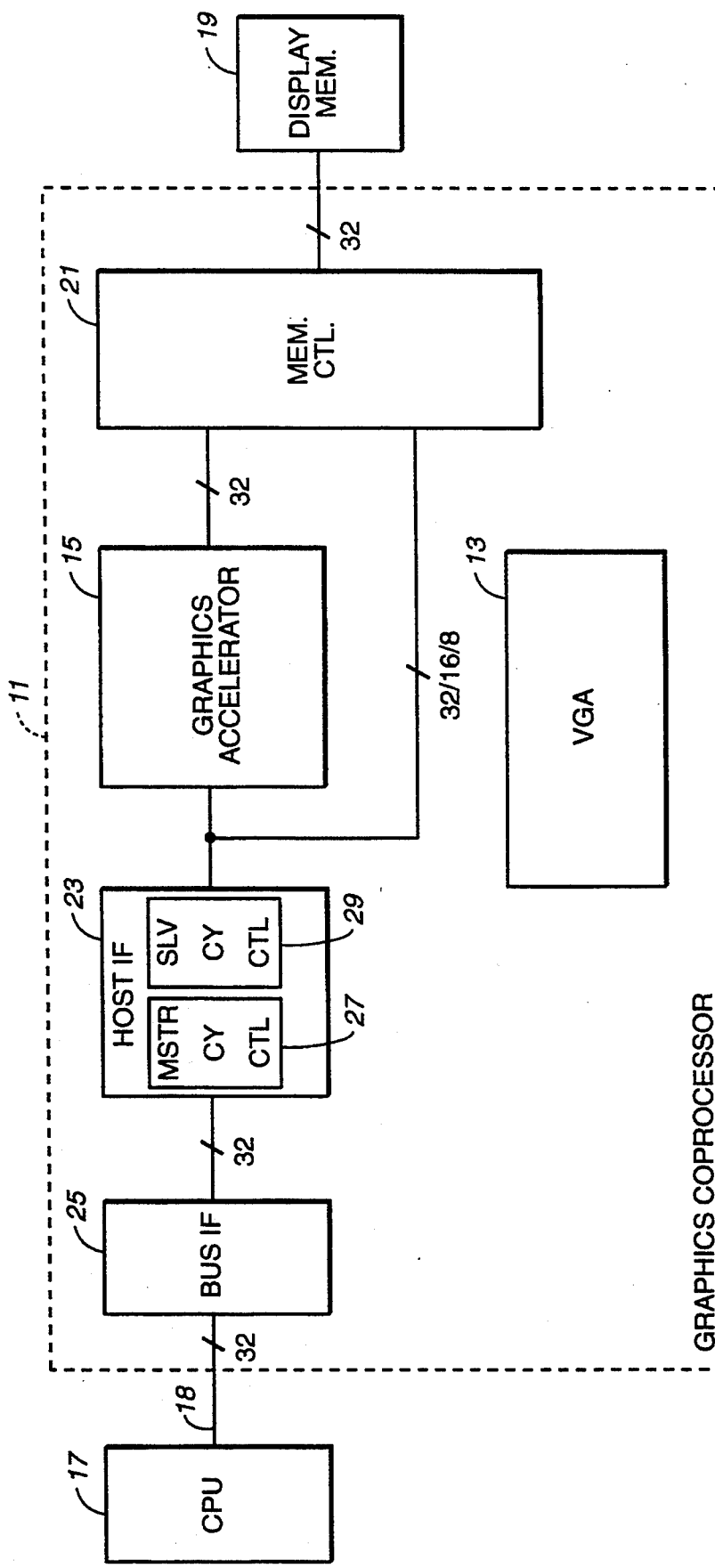
FIG._1

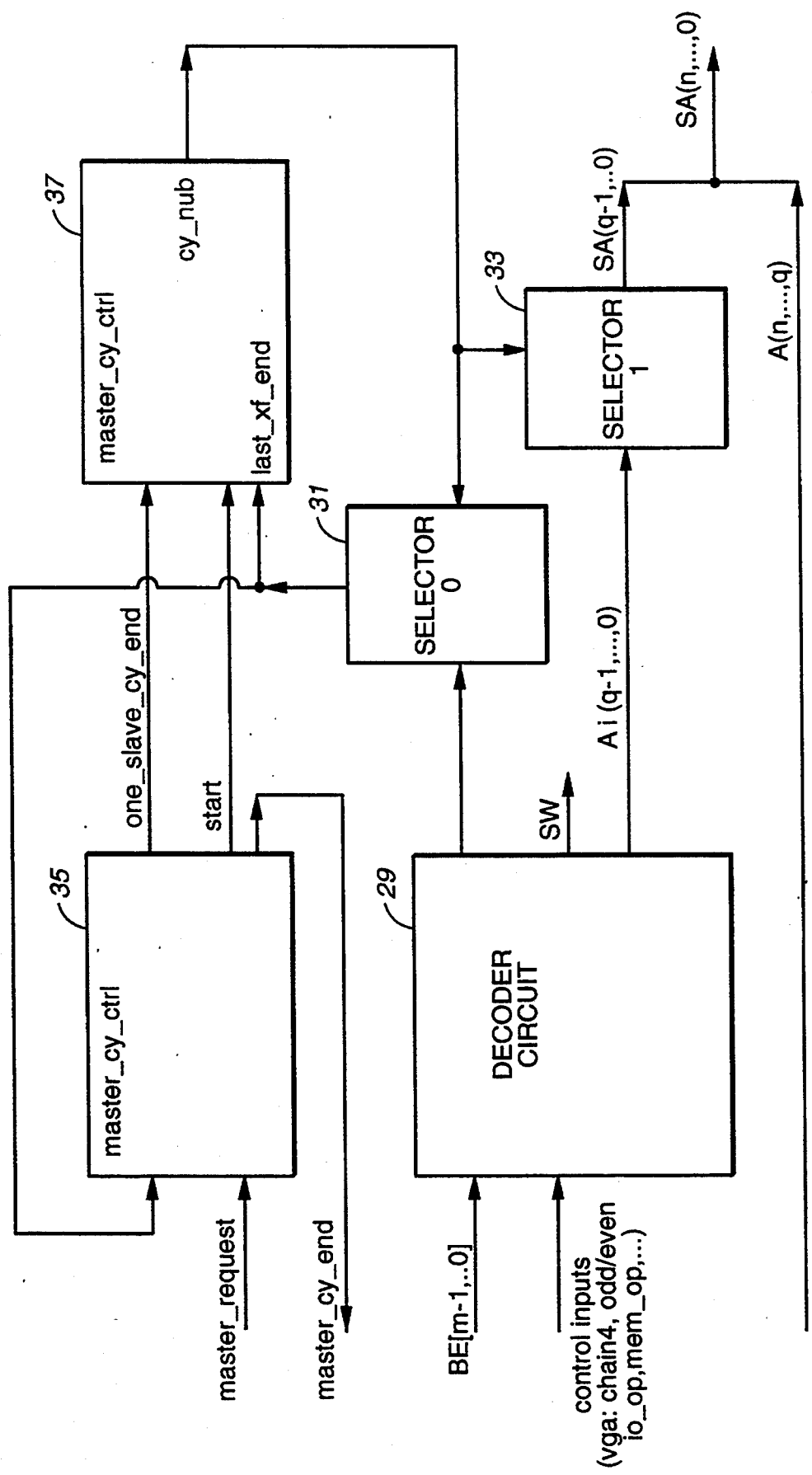
FIG._2

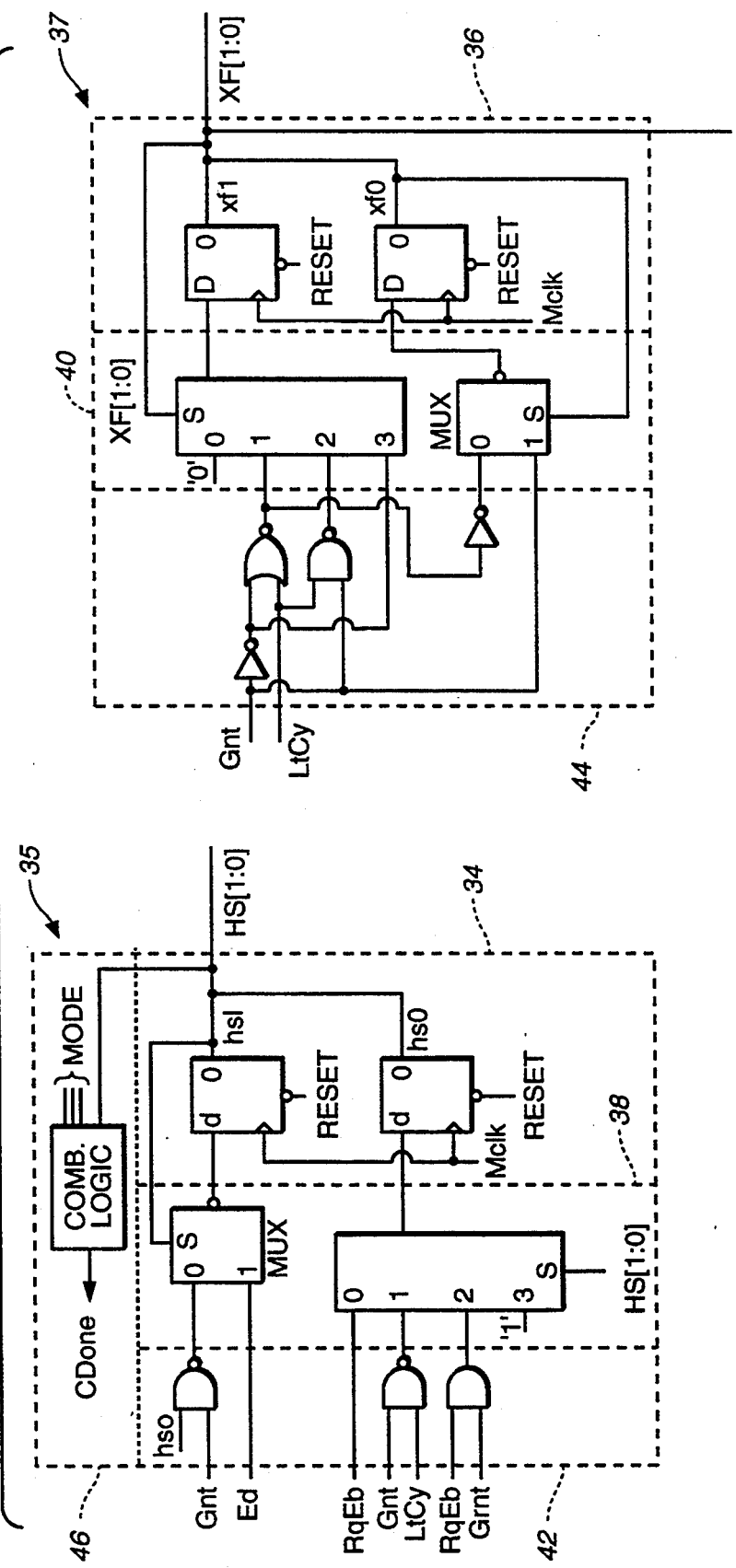

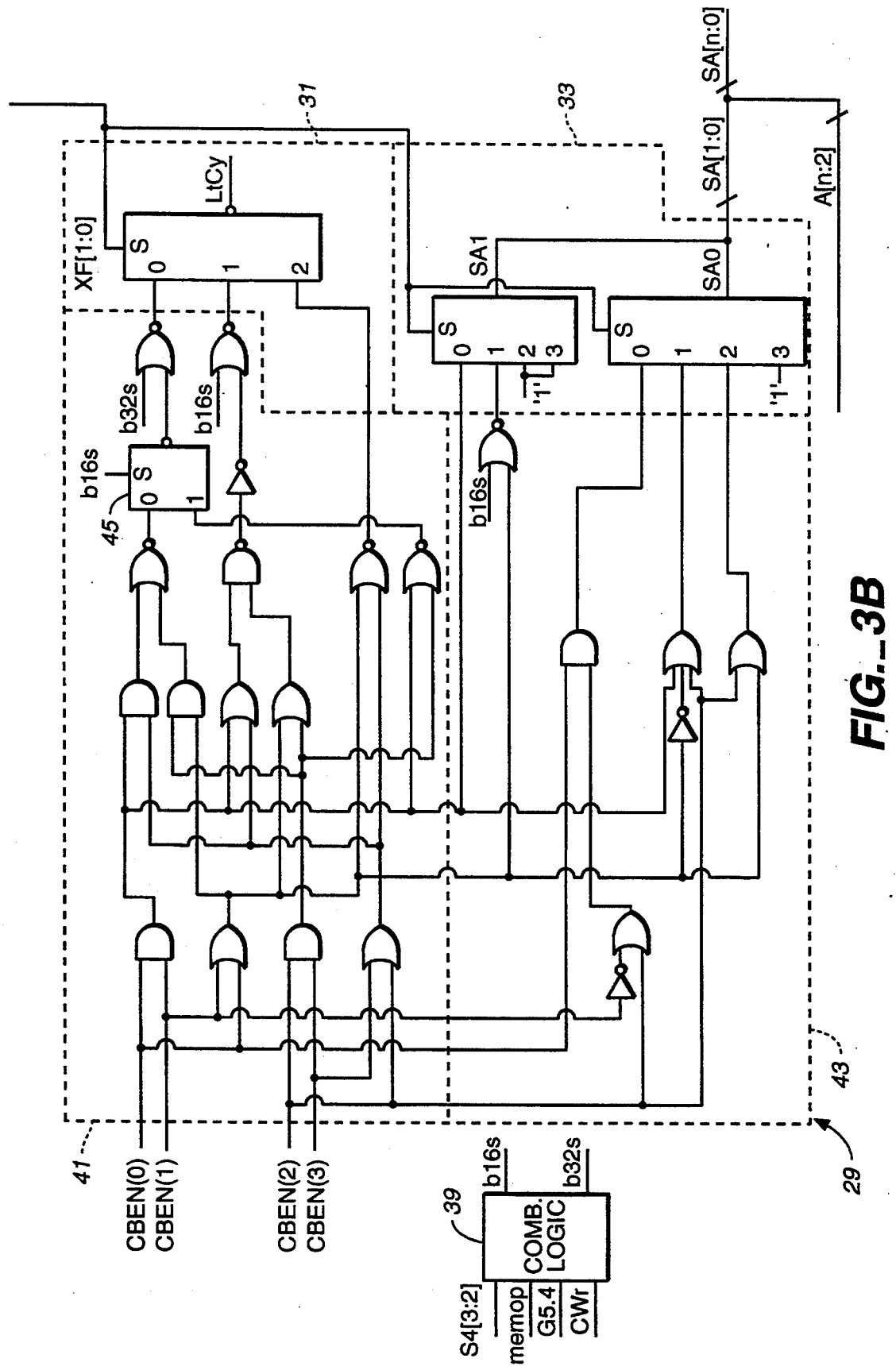
FIG._3B

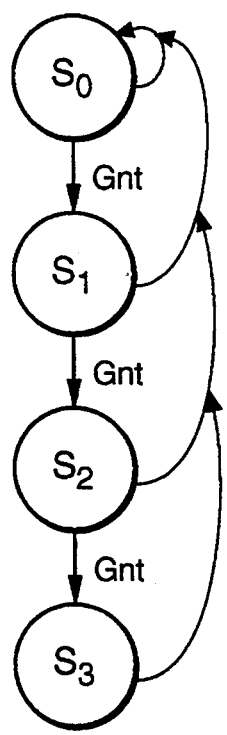
FIG._4
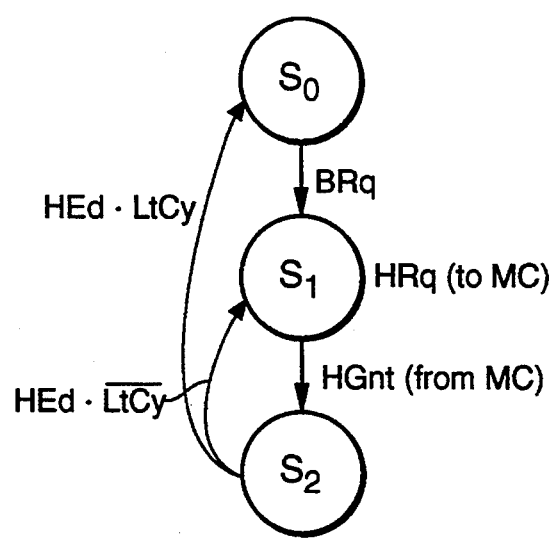
FIG._5

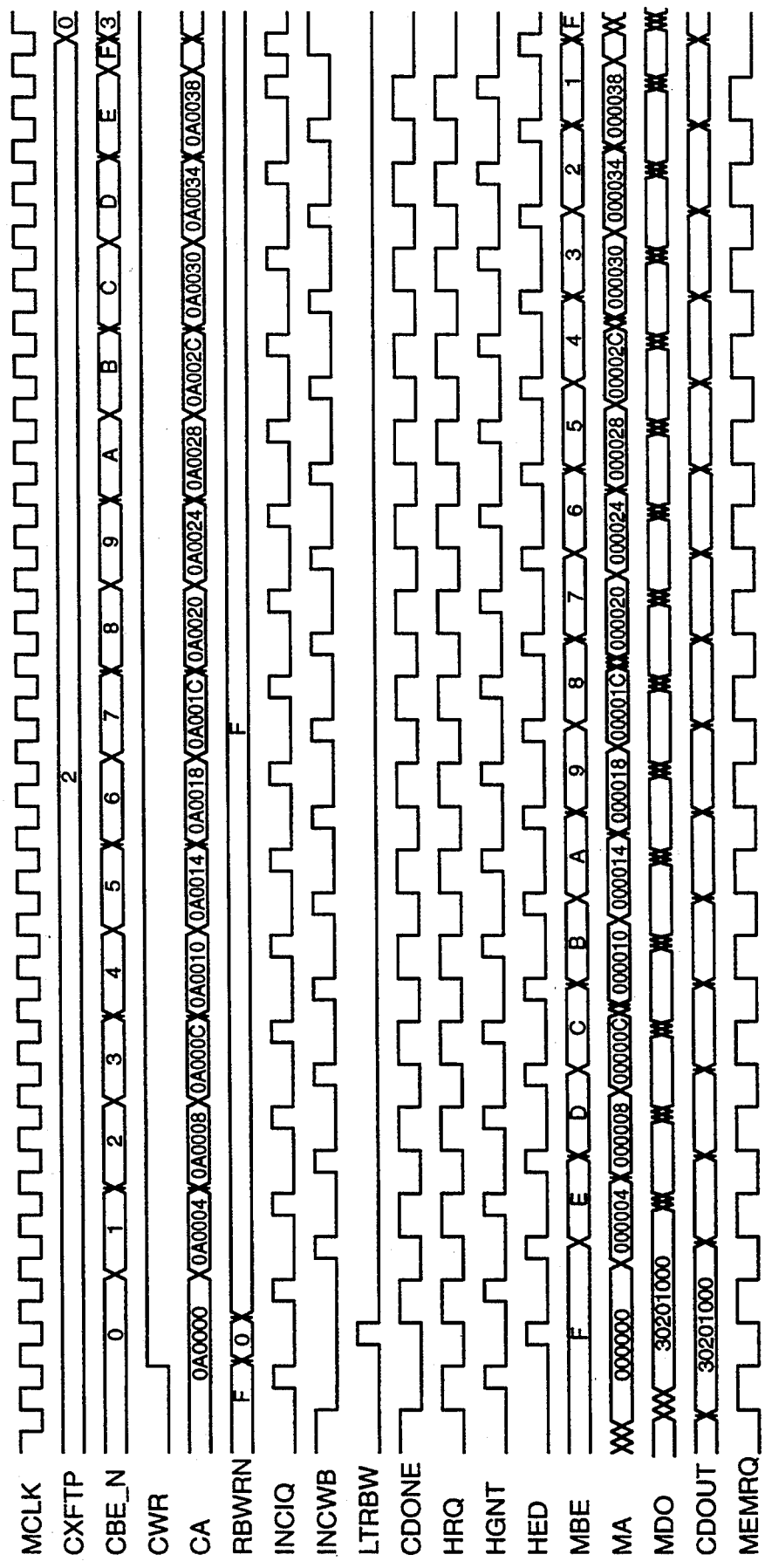
FIG._6A

| FIG._6A | |
|---|---|
| | FIG._6B |

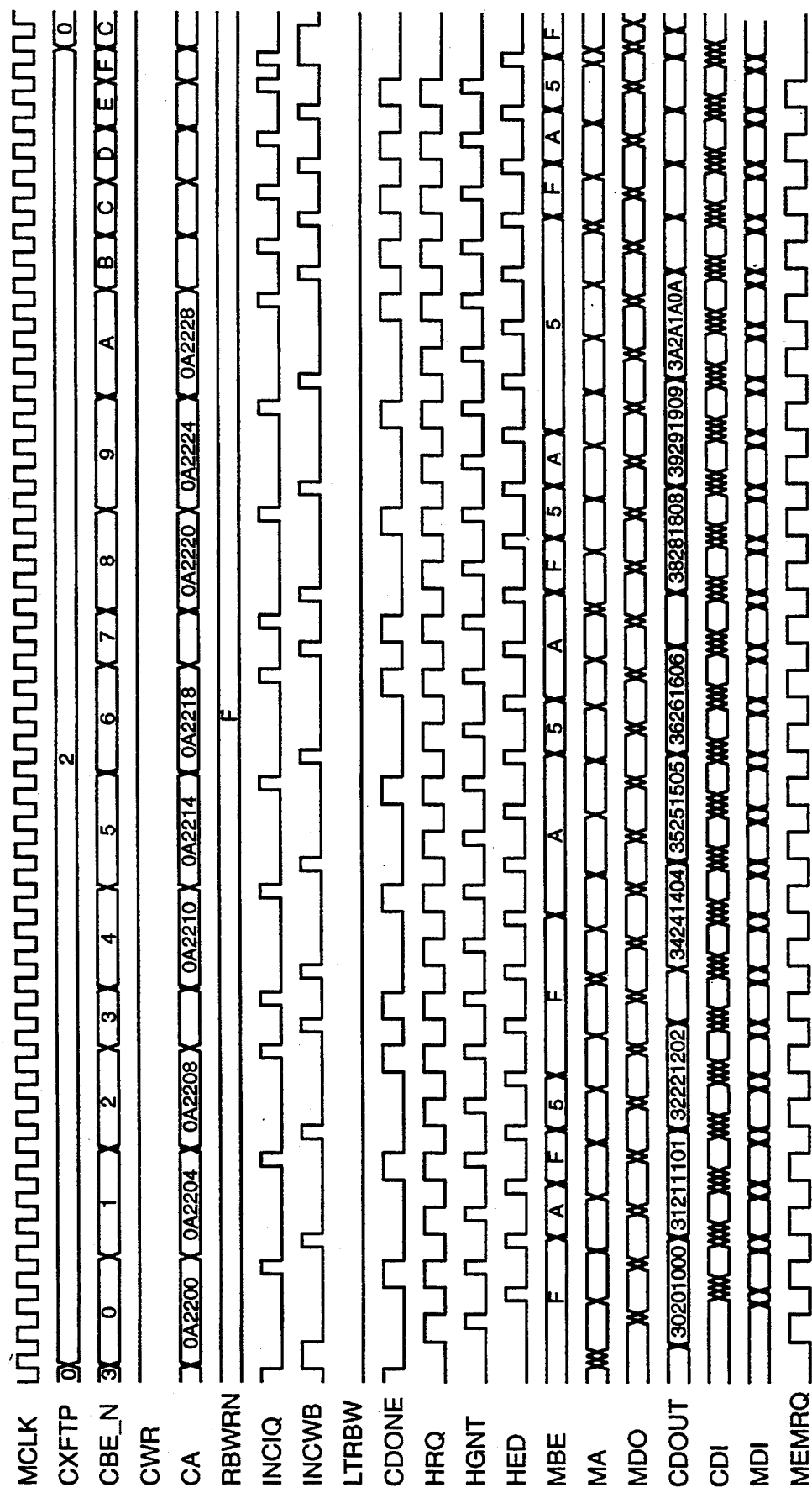
FIG._7A

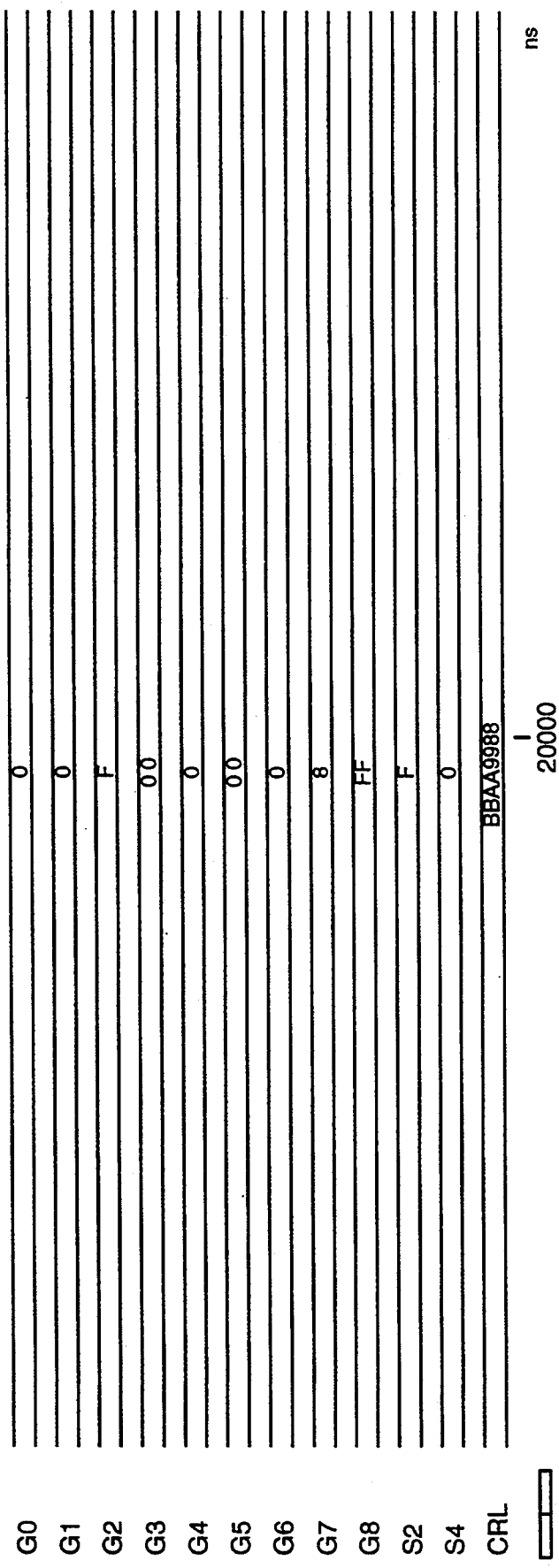
*FIG._7B*
*FIG._7*

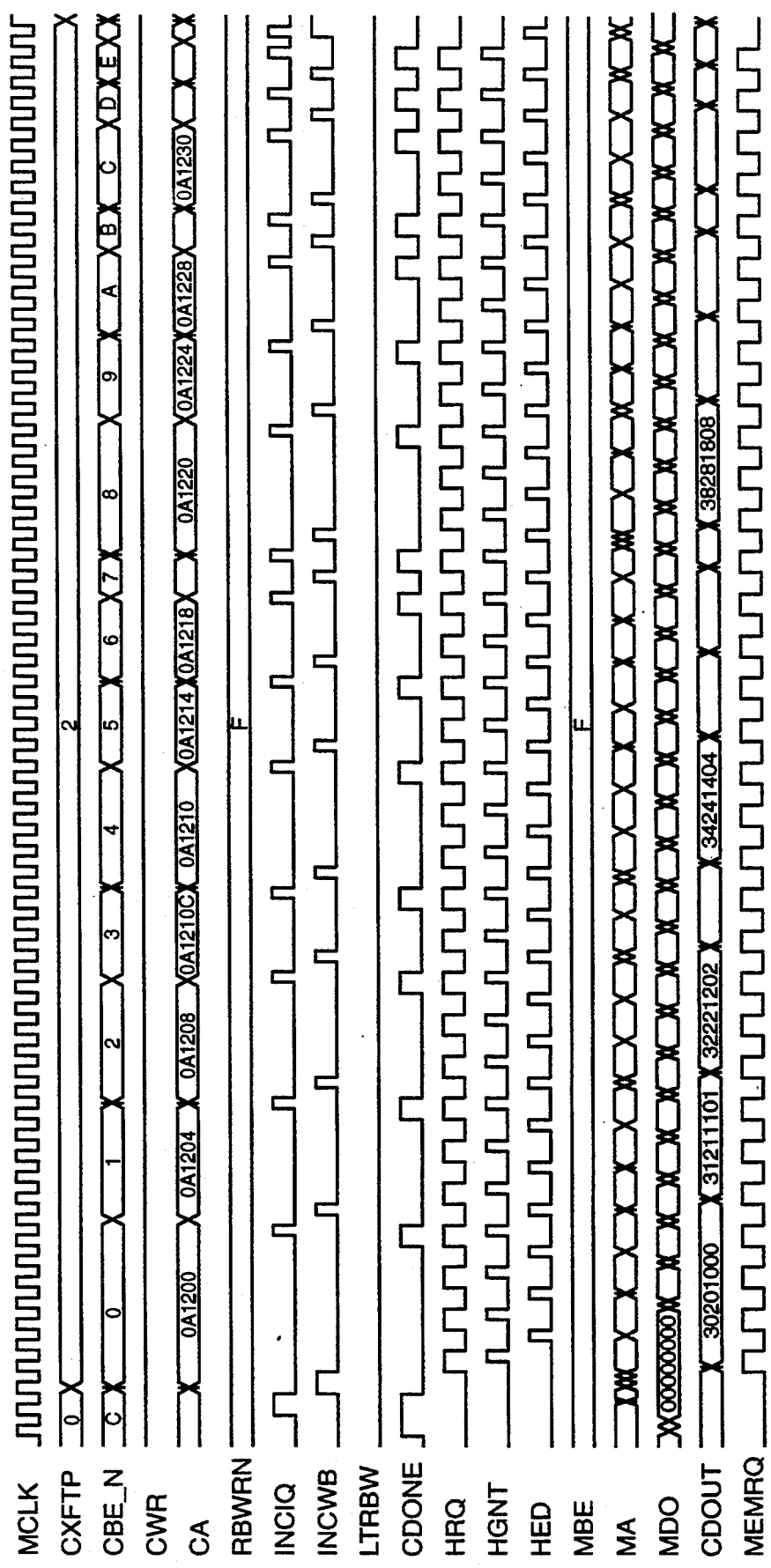
FIG._8A

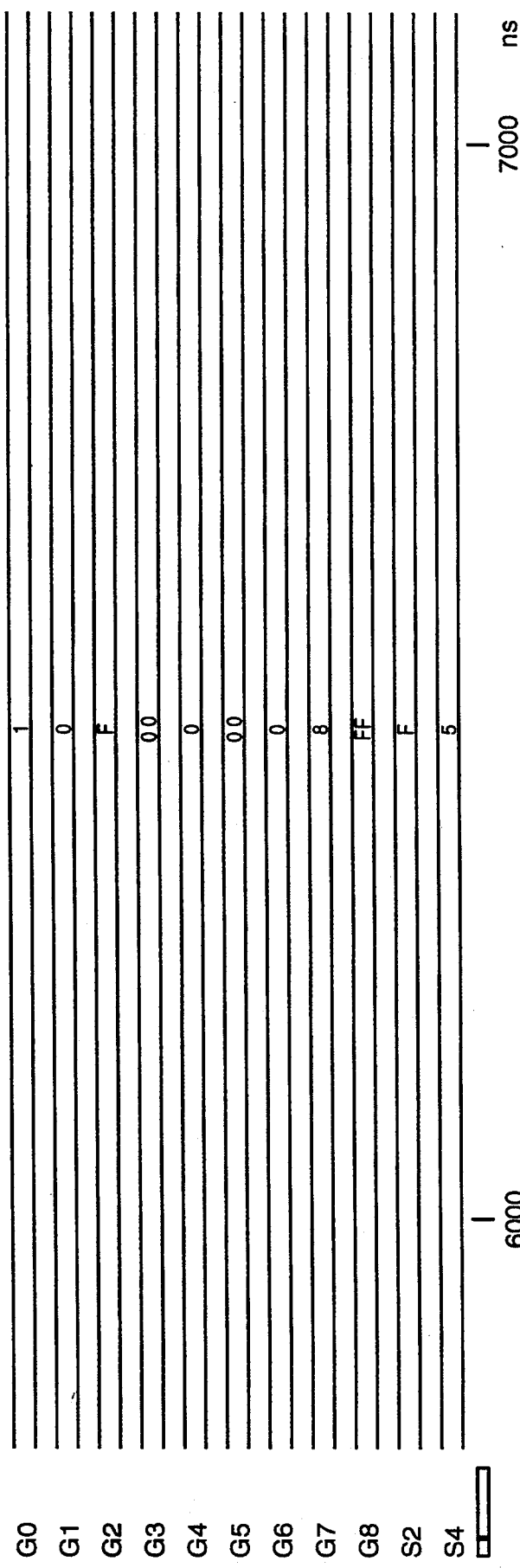

DYNAMIC SIZING BUS CONTROLLER THAT ALLOWS UNRESTRICTED BYTE ENABLE PATTERNS

This application is a continuation of application Ser. No. 08/019,429, filed Feb. 18, 1993, now abandoned.

BACKGROUND OF THE INVENTION

1. Field of the Invention

The present invention relates to bus controllers for controlling bus transfers between a host device and a slave device and more particularly to such a bus controller where a slave bus may have a variable width.

2. Background of the Invention

Since their introduction in the 1970's, microprocessors have advanced from 4, to 8, to 16 to 32-bit devices. In the not-too-distant future, 64 and 128-bit devices are expected to become commonplace. In order to maintain downward compatibility with previous-generation hardware and software, later generation devices must provide some flexibility in data transfer. An example of how such flexibility has been achieved in the past is provided by the Intel 80386 and 80486 microprocessors. The 386/486 processors are designed such that bus operands may be bytes (8-bits) words (16-bits) or double words (32-bits). In place of the two least significant address bits A0 and A1, the processor generates four byte enable signals BE0, BE1, BE2 and BE3, indicating which portion of the processor bus takes place in a particular transaction. For example, if the pattern of byte enable signals (which are active low) were 1110, only data lines D0–D7 would participate in the bus transaction. If the byte enable pattern were 1100, data lines D0–D15 would participate in the bus transaction.

Implicit in the byte enable pattern is the size of the operand being transferred. In the former example, the operand is a byte, and in the latter example, the operand is a word. Since the operand must be a byte, word, or double word, byte enable patterns in which two active byte enable bits are separated by one or more inactive byte enable bits do not occur. That is, the byte enable patterns are divided into a "legal" set and an "illegal" set. Further in accordance with the foregoing arrangement, a word operand is said to be aligned in memory if its address is a multiple of two, and a double word operand is said to be aligned in memory if its address is a multiple of four. A byte operand is always aligned. The data transfer mechanism does not require operand alignment. In the case of unaligned operands, however, multiple bus cycles may be required to complete the transfer of the operand. These multiple bus cycles are automatically generated by the microprocessor.

With the prevalence of graphical user interfaces, increasing reliance is being placed on graphics coprocessors to speed up graphics operations. One way in which a graphic coprocessor can speed up performance is to merge memory requests from the CPU when possible in order to increase data transfer efficiency. Request merge operations can cause "legal" byte enable patterns produced by the CPU to be altered in such a way as to produce modified "illegal" byte enable patterns. The 386/486 data transfer model then becomes unsuitable.

The present invention provides a dam transfer mechanism that overcomes the foregoing difficulty. The invention may be used to particular advantage in a PC graphics environment. More specifically, it may be used within a graphics coprocessor to realize a VGA-compatible 32/16/8 bus controller.

SUMMARY OF THE INVENTION

The present invention, generally speaking, provides a mechanism for data transfer between a host device and a slave device in which the slave bus width is automatically configured according to mode information, and the exact number of slave cycles required are generated according to the host request. In particular, the bus interface controller of the present invention interfaces a host device having a host bus of a predetermined physical bus width to a slave device having a slave bus of a variable one of multiple possible logical bus widths, where the host device physical bus width in bits is an integer multiple of the slave device logical bus width in bits. First circuitry is responsive to a request from the host device for exchanging handshaking signals with the slave device to execute a number of slave bus transfer cycles until a last cycle signal has been received, and for returning a completion signal to the host device. Second circuitry is responsive to mode-related signals and byte enable signals from the host device for generating the last cycle signal for the first circuitry. Together, the first circuitry and the second circuitry therefore implement what may be termed a "checking-and-moving" scheme. That is, the first circuitry continues to interact with the slave device to execute data transfer cycles until the first circuitry receives a last cycle signal from the second circuitry, which continually checks to see if the present cycle is the last cycle. The resulting data transfer mechanism is conceptually simple, scalable, and easy to implement.

BRIEF DESCRIPTION OF THE DRAWINGS

The present invention may be further understood from the following description in conjunction with the appended drawings. In the drawings:

FIG. 1 is a simplified block diagram showing one environment of the present invention;

FIG. 2 is a simplified block diagram of the bus controller of the present invention;

FIGS. 3, 3A and 3B are more detailed schematic diagrams of the bus controller of FIG. 2;

FIG. 4 is a state diagram illustrating operation of the slave cycle controller of FIG. 3;

FIG. 5 is a state diagram illustrating operation of the master cycle controller of FIG. 3; and FIGS. 6, 6A, 6B, 7, 7A, 7B, 8, 8A and 8B are timing diagrams of operation in different operational modes of the system of FIG. 1 incorporating the bus controller of the present invention.

DETAILED DESCRIPTION OF THE PREFERRED EMBODIMENTS

Referring now to FIG. 1, the present bus controller may be used to advantage in a graphics co-processor 11 including a VGA controller 13 and a window accelerator 15. The graphics co-processor 11 of FIG. 1 receives commands from a CPU 17 and in response to those commands performs operations involving data stored in display memory 19. The display memory 19 is controlled by a memory controller 21 provided as part of the graphics coprocessor 11. The memory controller 21 is connected through two alternate data paths to a host interface 23. One data path passes through the graphics accelerator 15, whereas the other data path bypasses the graphics accelerator 15. The host interface 23 is connected to a bus interface 25 that connects directly to the CPU 17. Preferably, the bus interface 25 includes a FIFO and address comparison circuitry whereby requests from the CPU 17 may be merged when possible in order to increase data transfer efficiency.

As described in greater detail hereinafter, the host interface 23 includes a master cycle controller 27 and a slave cycle controller 29. Together, the master cycle controller 27 and the slave cycle controller 29 realize a checking-and-moving data transfer scheme in which the master cycle controller 27 issues host requests and exchanges handshaking signals with the slave device (in this instance, the memory controller 21) while the slave cycle controller 29 continually checks to see if the present bus transfer cycle is the last.

All of the data paths shown in FIG. 1 are physically 32-bits wide. The data path that extends directly between the host interface 23 and the memory controller 21, however, may be configured to operate as either an 8-bit, 16-bit or 32-bit bus.

Referring to FIG. 2, a bus controller, or bus mapper, portion of the host interface of FIG. 1 is shown in greater detail. The bus controller is realized using a decoder circuit 29, two selectors (31, 33), and two simple state machines, a master state machine and a slave state machine. The master state machine functions as a master cycle controller 35, and the slave state machine functions as a slave cycle controller 37. The bus controller allows all byte enable patterns without restriction, providing increased flexibility useful in some applications. Byte enable signals and control signals indicative of the slave bus width are input to the decoder 29. Signals from the decoder 29 are used to generate lower order address bits and to generate the exact number of slave cycles required to execute the host request. For example, a byte enable pattern of 0001 requires three slave cycles assuming an 8-bit bus (two slave cycles assuming a 16-bit bus). A byte enable pattern of 0111 requires just a single slave cycle. The bus controller of FIG. 2 is scalable and may be easily modified to accommodate hosts having data buses 64 or 128 bits wide.

In general, the bus mapper maps a host bus of arbitrary width to a variable width port by automatically generating multiple transfer cycles. The variable slave bus width is therefore auto-configurable, with the bus controller generating multiple slave cycles for one master cycle request. Assume for example, that the input-/output data path 18 in FIG. 1 is $m=2^q$ bytes wide, where $q=0, 1, 2, 3, \ldots$. Assume further that the address bus (not shown) from the CPU is $(n-q)$ bits wide, represented as $A(n \ldots q)$. Referring again to FIG. 2, the slave side bus may be configured to have a width of $2^p$ bits where $p=0, 1, 2, 3, \ldots$. The slave side bus width may therefore represented as $SW(1 \ldots 2^p)$. A byte enable bus is m bits wide, represented as $BE (m-1 \ldots 0)$. The slave side bus address is formed by concatenation of bits $A(n \ldots q)$ from the address bus together with q lower order address bits generated by the decoder circuit. The concatenation operation may be represented as $A(n \ldots q) | SA (q-1 \ldots 0)$, resulting in a slave side address $SA (n \ldots 0)$.

The master cycle controller 35 receives a master request from the bus interface 25 and returns a master cycle end signal to the bus interface 25 upon completion of a data transfer operation corresponding to the master request. The slave cycle controller 37 receives signals indicating when a slave cycle has started and when a slave cycle has ended. Conceptually, these signals are provided by the master cycle controller 35. In practice, however, equivalent signals may be provided by the slave device itself (the memory controller 21). The slave cycle controller 37, using the foregoing signals, counts the number of slave cycles that have been executed and produces a cycle number signal. The cycle number signal is input to selector 31, used to produce a last cycle signal when the last required slave cycle has been performed, and to selector 33, used to select appropriate lower order address signals for concatenation with the host address.

The decoder circuit 29 receives byte enable bits $BE[m-1 \ldots 0]$ together with control inputs containing mode information indicative of the desired slave side bus width. For example, in a VGA graphics co-processor, the control inputs may include signals designating chain 4 mode, odd/even mode, etc. The control inputs also include signals IO_OP and MEM_OP designating whether an IO operation is to be performed (in which case the bus mapper remains idle) or a memory operation is to be performed. Responsive to the control inputs and the byte enable pattern, the decoder circuit 29 determines the slave side bus width and the number of slave cycles required. If the bus interface 25 of FIG. 1 performs request merge operations, then the byte enable signals $BE [m-1 \ldots 0]$ will be from the bus controller and may differ from byte enable signals that might otherwise be produced by the CPU.

The decoder circuit 29 produces lower order address bits for each required slave cycle. The address bits are input to selector 33 and selected between according to the cycle number. The decoder circuit 29 produces signals for input to selector 31 such that the output of selector 31 is asserted as the last cycle signal only after the required number of slave cycles has been executed. In addition, the decoder circuit produces a signal SW indicative of the slave side bus width for use elsewhere in the bus controller.

In operation, the decoder circuit 29, using the byte enable signals and the control inputs (containing slave bus width information), generates lower order physical address bits and tag bits denoting whether a particular transfer is the last one. The slave cycle controller 37 idles in a transfer 0 state and is activated by the start signal from the master controller 35. The slave controller 37 checks the output of selector 31 to see whether the current transfer is the last one, in which case it re-enters the transfer 0 state. Otherwise, the slave cycle controller 35 enters a state corresponding to the next transfer, incrementing the cycle number. Initially, the master cycle controller 35 is in a sleep state and is woken up by a master request (usually from the host CPU). Upon receipt of the master request, the master cycle controller 35 invokes the slave controller 37 to start the checking-and-moving scheme. The master controller 35 sends the start signal to the slave controller 37 to notify the slave controller 37 when the checking-and-moving process is to be started. When the current transfer is the last one as indicated by the last cycle signal, the master controller 35 produces a master cycle end signal to finish the master transfer.

FIG. 3 shows in greater detail an implementation of the bus mapper circuit for the case of a 32-bit input/output data path. The master cycle controller and the slave cycle controller state machines (35, 37) are each realized using a pair of state flipflops (pairs 34, 36) for storing a current state, multiplexing circuitry (38, 40) for producing a next state signal in response to the current state and various state variables, and combinational logic (42, 44) for producing logical combinations of the state variables. In addition, the master cycle controller 35 includes combinatorial logic 46 for producing an output signal CDone corresponding to the master cycle end signal in FIG. 2. State variables include a request enable signal RqEb, a grant signal Gnt, an end signal Ed and a last cycle signal LtCy. The request enable signal corresponds to the master request in FIG. 2 and is received from the host device. The grant and end signals are received from the slave device (the memory controller 21) at the beginning and end, respectively, of a slave cycle. The last cycle signal is produced by the bus mapper using the tags produced by the decoder circuit 29.

The decoder circuit 29 includes three combinatorial logic groups (39, 41, 43) that may be realized using "random" logic (logic gates) or "programmed" logic. In the implementation of FIG. 3, the combinatorial logic is realized using AND, NAND, OR and NOR gates together with invertors. The second combinatorial logic group 41 also includes a 1-bit multiplexor 45. The first combinatorial logic group 39 generates signals b16s and b32s indicative of the slave side bus width. When neither of the foregoing signals is active, the slave side bus width is 8 bits. Inputs to the first combinatorial logic group 39 include VGA register bits S4 [3:2], the signal MEM_OP, the VGA register signal G5 [4:4] and a write signal CWr. The inputs to the second and third combinatorial logic groups (41, 43) are the byte enable signals CBEN(0)–CBEN(3) and the slave bus width signals b16s and b32s generated by the first combinatorial logic group 39.

The second combinatorial logic group 41 produces three tag signals input respectively to inputs 0, 1 and 2 of selector 31 and indicating whether the respective slave bus transfer cycle is the last. If transfer 2 is not the last transfer, then the next transfer is necessarily the last. Accordingly, a fourth tag signal is unnecessary. The third logic group 43 produces four pairs of address bits $SA_1$ and $SA_0$. The address bits are input to selector 33, realized in the implementation of FIG. 3 by a dual 4-bit multiplexor. The pairs of address bits are selected between by the cycle number (or transfer number) XF produced by the slave cycle controller. The decoder circuit 41 and the two selectors (31, 33) operate in accordance with Table 1 below. In Table 1, an "!" following slave address bits SA[1:0] indicates that the last cycle signal is asserted.

TABLE 1

| CBEN(3)–CBEN(0) | SW | | XF0 | XF1 | XF2 | XF3 |
|---|---|---|---|---|---|---|
| 0000 | b32s | SA[1:0] | 00! | — | — | — |
| | b16s | SA[1:0] | 00 | 10! | — | — |
| | b8s (implicit) | SA[1:0] | 00 | 01 | 10 | 11 |
| 0001 | b32s | SA[1:0] | 00! | — | — | — |
| | b16s | SA[1:0] | 00 | 10! | — | — |
| | b8s | SA[1:0] | 01 | 10 | 11! | — |
| 0010 | b32s | SA[1:0] | 00! | — | — | — |
| | b16s | SA[1:0] | 00 | 10! | — | — |
| | b8s | SA[1:0] | 00 | 10 | 11! | — |
| 0011 | b32s | SA[1:0] | 00! | — | — | — |
| | b16s | SA[1:0] | 10! | — | — | — |
| | b8s | SA[1:0] | 10 | 11! | — | — |
| 0100 | b32s | SA[1:0] | 00! | — | — | — |
| | b16s | SA[1:0] | 00 | 10! | — | — |
| | b8s | SA[1:0] | 00 | 01 | 11! | — |
| 0101 | b32s | SA[1:0] | 00! | — | — | — |
| | b16s | SA[1:0] | 00 | 10! | — | — |
| | b8s | SA[1:0] | 01 | 11! | — | — |

TABLE 1-continued

| CBEN(3)–CBEN(0) | SW | | XF0 | XF1 | XF2 | XF3 |
|---|---|---|---|---|---|---|
| 0110 | b32s | SA[1:0] | 00! | — | — | — |
| | b16s | SA[1:0] | 00 | 10! | — | — |
| | b8s | SA[1:0] | 00 | 11! | | |
| 0111 | b32s | SA[1:0] | 00! | — | — | — |
| | b16s | SA[1:0] | 10! | — | — | — |
| | b8s | SA[1:0] | 11! | — | — | — |
| 1000 | b32s | SA[1:0] | 00! | — | — | — |
| | b16s | SA[1:0] | 00 | 10! | — | — |
| | b8s | SA[1:0] | 00 | 01 | 10! | — |
| 1001 | b32s | SA[1:0] | 00! | — | — | — |
| | b16s | SA[1:0] | 00 | 10! | — | — |
| | b8s | SA[1:0] | 01 | 10! | — | — |
| 1010 | b32s | SA[1:0] | 00! | — | — | — |
| | b16s | SA[1:0] | 00 | 10! | — | — |
| | b8s | SA[1:0] | 00 | 10! | — | — |
| 1011 | b32s | SA[1:0] | 00! | — | — | — |
| | b16s | SA[1:0] | 10! | — | — | — |
| | b8s | SA[1:0] | 10! | — | — | — |
| 1100 | b32s | SA[1:0] | 00! | — | — | — |
| | b16s | SA[1:0] | 00! | — | — | — |
| | b8s | SA[1:0] | 00 | 01! | — | — |
| 1101 | b32s | SA[1:0] | 00! | — | — | — |
| | b16s | SA[1:0] | 00! | — | — | — |
| | b8s | SA[1:0] | 01! | — | — | — |
| 1110 | b32s | SA[1:0] | 00! | — | — | — |
| | b16s | SA[1:0] | 00! | — | — | — |
| | b8s | SA[1:0] | 00! | — | — | — |
| 1111 | b32s | SA[1:0] | X | X | X | X |
| | b16s | SA[1:0] | X | X | X | X |
| | b8s | SA[1:0] | X | X | X | X |

From Table 1 it may be observed that, in contrast to the prior art, the present bus controller generates exactly the required number of slave bus transfer cycles. In the prior art, for example, the byte enable pattern 0110 is disallowed. The closest allowable byte enable pattern is 0000. With the slave side bus configured to have a bus width of 8 bits, four slave bus transfers cycles would then be required instead of two. The present bus controller allows these extra cycles to be skipped, resulting in cycle savings of up to 50%.

The operation of the slave cycle controller 37 and the master cycle controller 35 may be better understood with reference to FIG. 4 and FIG. 5, respectively. Consistent with FIG. 3, FIG. 4 and FIG. 5 both assume that the input/output data path is 32-bits wide. Referring first to FIG. 4, the slave cycle controller 37 idles in state $S_0$ corresponding to transfer 0 until a grant signal Gnt is received from the slave device. The grant signal Gnt from the slave device functions as the equivalent of the start and slave cycle end (one_slave_cy_end) signals in FIG. 2. Upon receipt of a grant signal Gnt the slave cycle controller 37 transitions to state $S_1$ corresponding to transfer 1. In state S1 and each successive state thereafter (excluding state $S_0$), if a last cycle signal LtCy is received, the slave cycle controller 37 returns to state $S_0$. If instead another grant signal Gnt is received, the slave cycle controller 37 transitions to the next successive state corresponding to the next transfer cycle.

Referring to FIG. 5, the master cycle controller 35 remains in state $S_0$ until the request enable signal RqEb is received. The master cycle controller 35 then transitions to state $S_1$. (Unlike the slave cycle controller, in the case of the master cycle controller, the state numbers do not necessarily correspond to the binary count contained in the state register flipflops.) When the master cycle controller 35 is in state $S_1$, the corresponding state information is used by the bus controller to generate a slave request, which is sent to the slave device (the memory controller 21). When a grant signal Gnt is received from the slave device, the master cycle controller 35 then transitions to state $S_2$ awaiting a further signal from the slave device indicating the end of the slave bus transfer cycle. When the end signal Ed is received from the slave device and the last cycle signal LtCy is inactive, the master cycle controller 35 transitions back to state $S_1$. If the last cycle signal LtCy is active when the end signal Ed is received, the master cycle controller 35 returns to state $S_0$ to await a further master request.

Operation of the present bus controller may be more fully understood from the timing diagrams of FIGS. 6-8. Although only certain ones of the signals in the timing diagrams of FIGS. 6-8 are germane to the present invention, the significance of each of the signals will be briefly explained. The MCLK signal is the display memory clock. Each memory transfer requires two memory clock cycles. The signal CXFTP denotes the type of transfer (memory, IO, etc). The CBE_N signal represents the byte enable pattern. The CWR signal denotes a write operation. The CA signal is the host address. Other than the MCLK signal, the foregoing signals are outputs from the bus interface 21.

The RBWRN signal is a read buffer write signal that is active low, the INCIQ signal is an increment instruction queue signal, the INCWB signal is an increment write buffer signal, and the L_RBW is a last read buffer write signal. The foregoing signals are input to the bus interface 25 and pertain to request merge operations. The CDone signal is also input to the bus interface 25 and is produced by the master cycle controller 35 to signal completion of a master request.

The HRQ signal is a master request signal produced by the host interface 23 and input to the memory controller 21. The memory request signal MEMRQ is equivalent to the HRQ signal.

The HGNT and HED signals are signals from the memory controller 21 to the host interface 23 and correspond to the Gnt and Ed signals referred to previously.

The MBE, MA and MDO signals are signals from the host interface 23 to the memory controller 21 and represent memory byte enable signals, memory address signals, and memory data out signals (data output from the bus controller to be written to memory). Similarly, the CDOUT signal represents data output from the bus interface 25 to be written to memory. The MDO and CDOUT signals are therefore identical but time shifted relative to one another.

The signals G0-G8, S2 and S4 are control inputs from VGA registers. Of these, the S4 and G5 register signals are most relevant to the present invention.

FIG. 6 corresponds to the case in which the slave bus is configured to be 32 bits wide. Note from Table 1 that when the slave bus is 32 bits wide, only a single slave bus transfer cycle (two memory clocks in duration) is required to complete the host request. Regardless of the byte enable pattern CBE_N, only two memory clock periods are therefore required to complete the master request. In the case of CBE_N=F, no bytes are enabled, such that the transfer cycle is aborted within a single clock cycle.

FIG. 7 represents the case in which the slave bus is configured to be 16 bits wide. From Table 1 it may be appreciated that, with the slave bus 16 bits wide, a master request requires at most two slave bus transfer cycles and sometimes only a single slave bus transfer cycle to complete the request. When CBE_N is 3, 7, B, C, D or E, only a single slave bus transfer cycle is required.

FIG. 8 represents the case in which the slave bus is configured to be 8 bits wide. Depending on the byte enable pattern, anywhere from one to four slave bus transfer cycles may therefore be required. Four slave bus transfer cycles are required when CBE_N is 0. Three slave bus transfer cycles are required when CBE_N is 1, 2, 4 or 8, two slave bus transfer cycles are required when CBE_N is 3, 5, 6, 9, A or C, and a single slave bus transfer cycle is required when CBE_N is 7, B, D or E.

Using a conceptually simple data transfer mechanism that is easy to implement, the present bus controller avoids the byte enable pattern restrictions of the prior art, increasing flexibility and enabling a cycle savings of up to 50% to be achieved. The present bus controller is also easily scalable, providing a data transfer mechanism suitable for both present generation and future generation computing devices.

The foregoing has described the principles, preferred embodiments and modes of operation of the present invention. However, the invention should not be construed as limited to the particular embodiments discussed. Instead, the above described embodiments should be regarded as illustrative rather than restrictive, and it should be appreciated that variations may be made in those embodiments without departing from the scope of the invention as defined by the following claims.

What is claimed is:

1. Apparatus for interfacing a host device having a host bus of a predetermined physical bus width to a slave device having a slave bus of a variable one of multiple possible logical bus widths, where one of the host device physical bus width and the slave device logical bus width is an integer multiple of the other of the host device physical bus width and the slave device logical bus width, comprising:

first means (35) responsive to a request from said host device for exchanging handshaking signals with said slave device to execute a number of slave bus transfer cycles until a last cycle signal has been received and for returning a completion signal to said host device; and second means (29, 31, 37) responsive to a plurality of mode-related signals and a plurality of byte enable signals from said host device for generating said last cycle signal for said first means.

2. A method of responding to a data transfer request from a host device having a host bus of a predetermined host device physical bus width by a slave device having a slave bus of a variable one slave device logical bus width of multiple possible slave device logical bus widths, where one of the host device physical bus width and the slave device logical bus width is an integer multiple of the other of the host device physical bus width and the slave device logical bus width, comprising the steps of:

a) determining in response to a plurality of byte enable signals and a plurality of mode-related signals from the host device the logical bus width of the slave device and a number of slave bus cycles required to complete the requested data transfer;

b) generating low-order address bits for each of the number of slave bus cycles required; and c) executing exactly the number of slave cycles required to complete the requested data transfer.

3. The method of claim 2, wherein one slave cycle is required for each time that, taking the byte enable signals in order in groups of n at a time where n represents the slave bus width in bytes, the group of byte enable signals includes at least one byte enable signal that is asserted.

* * * * *